(12) United States Patent
Islam et al.

(10) Patent No.: US 8,528,932 B2
(45) Date of Patent: Sep. 10, 2013

(54) DEVIATING AIRBAG

(75) Inventors: Rakibul Islam, Rancho Cucamonga, CA (US); Robert W. Trimble, Gainesville, TX (US); Raul Daniel Flores Aguirre, Chihuahua (MX); Frederic Quatanens, Issoudon (FR); Jeremy Cailleteau, St. Aout (FR); Jeremy Gaudin, Saint-Maur (FR); Virgile Martinez, Segry (FR); Jean-Marc Obadia, Maubec (FR)

(73) Assignee: Zodiac Seats France (FR)

( * ) Notice: Subject to any disclaimer, the term of this patent is extended or adjusted under 35 U.S.C. 154(b) by 0 days.

(21) Appl. No.: 13/428,171

(22) Filed: Mar. 23, 2012

(65) Prior Publication Data
US 2013/0009389 A1 Jan. 10, 2013

Related U.S. Application Data

(60) Provisional application No. 61/504,728, filed on Jul. 6, 2011.

(51) Int. Cl.
*B60R 21/16* (2006.01)

(52) U.S. Cl.
USPC ...................................... 280/730.2

(58) Field of Classification Search
USPC ........................... 280/730.1, 730.2
See application file for complete search history.

(56) References Cited

U.S. PATENT DOCUMENTS

| | | | |
|---|---|---|---|
| 5,411,425 A * | 5/1995 | Rinker | 441/130 |
| 6,386,580 B1 * | 5/2002 | Nanbu et al. | 280/732 |
| 7,828,322 B2 * | 11/2010 | Breuninger et al. | 280/730.2 |
| 7,845,683 B2 * | 12/2010 | Sato et al. | 280/743.2 |
| 7,922,193 B2 * | 4/2011 | Breuninger et al. | 280/730.2 |
| 2003/0141709 A1 | 7/2003 | Honda et al. | |
| 2004/0130131 A1 * | 7/2004 | Thomas et al. | 280/731 |
| 2005/0151351 A1 * | 7/2005 | Enders et al. | 280/730.1 |
| 2010/0276916 A1 * | 11/2010 | Breuninger et al. | 280/730.2 |
| 2012/0049491 A1 * | 3/2012 | Yoo | 280/729 |

FOREIGN PATENT DOCUMENTS

| | | | |
|---|---|---|---|
| JP | 2011057142 A * | 3/2011 | |
| WO | 0053460 | 9/2000 | |
| WO | 2011074350 | 6/2011 | |

OTHER PUBLICATIONS

European Search Report dated Oct. 1, 2012 in Application No. EP12165073.3.

* cited by examiner

*Primary Examiner* — Faye M. Fleming
(74) *Attorney, Agent, or Firm* — Dean W. Russell; Kristin M. Crall; Kilpatrick Townsend & Stockton LLP

(57) ABSTRACT

Embodiments of the present invention provide an airbag system formed from non-traditional or asymmetric airbag shapes that deflect a vehicle occupant away from an interior vehicle structure.

14 Claims, 3 Drawing Sheets

DEVIATING AIRBAG

CROSS REFERENCE TO RELATED APPLICATIONS

This application claims the benefit of U.S. Provisional Application Ser. No. 61/504,728, filed Jul. 6, 2011, titled "Deviating Airbag," the entire contents of which are hereby incorporated by reference.

FIELD OF THE INVENTION

Embodiments of the present invention relate generally to airbags for use in passenger transport vehicles. The airbags are designed to safely interrupt a passenger's forward momentum in the event of a crash condition.

BACKGROUND

Airbags are occupant restraining devices, which typically include a flexible envelope or "bag" that is designed to inflate rapidly during a collision in order to prevent the vehicle's occupants from striking interior objects located in front of (or, in some cases, on the side of) the occupant. In automobiles, airbags are designed to prevent occupants from striking the steering wheel, the vehicle door, a window, or any other interior objects. In aircraft, airbags are designed to prevent passengers from striking the seat in front each passenger, the tray tables, a window, or any other interior objects. Airbags on passenger rail cars (such as trains, monorails, trolleys), motorcycles, and other passenger transport vehicles work similarly.

Most modern vehicles contain multiple airbags. For example, most automobiles provide an airbag in front of each occupant seating position (at least in the front seat), to protect the head and torso. They may also contain knee airbags, which protect the occupant's knees and legs. Most aircraft provide airbags either positioned in the back of each seat (so as to deploy for the passenger sitting behind that seat) or in the seat belts. (For example, passengers sitting in the front seat or bulkhead in the aircraft do not have a seat in front of them, so in this instance, the airbag may be positioned in the passenger seat belt.) Passenger vehicles may also contain airbags in side locations, which can inflate between an occupant and the vehicle door or the vehicle window or wall.

Typically, sensors deploy one or more airbags in an impact zone at variable rates based on the type and severity of impact. Most airbags are designed to only inflate in moderate to severe frontal crashes. Airbags are normally designed with the intention of supplementing the protection of an occupant who is correctly restrained with a seatbelt.

Airbags are typically designed as large bags that require a large volume of gas for their inflation. They are typically round in shape, or peanut shaped, often formed by sewing two or three panels together in order to form a balloon or peanut shape.

Since their invention in the early 1950's and introduction in the mid-1970's, airbags have continually been improved upon. However, further airbag improvements are desirable, including airbags that have varying designs for varying types of seating arrangements in passenger vehicles.

BRIEF SUMMARY

Embodiments of the invention described herein provide airbags that are designed to deflect a vehicle occupant away from an interior vehicle structure using an airbag with sides, rather than "catching" the occupant in the middle of a circular or spherical airbag.

DETAILED DESCRIPTION

Figure 1:
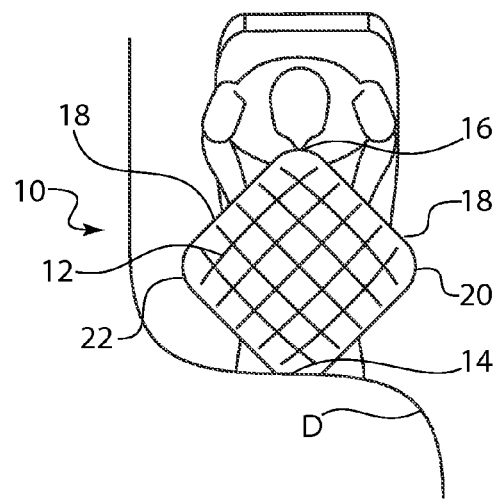
FIG. 1 shows a top plan view of an airbag according to one embodiment of this invention.
Figure 2:
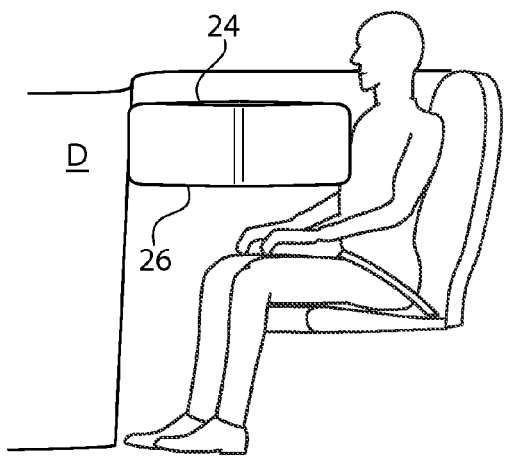
FIG. 2 shows a side plan view of the airbag of FIG. 1.
Figure 3:
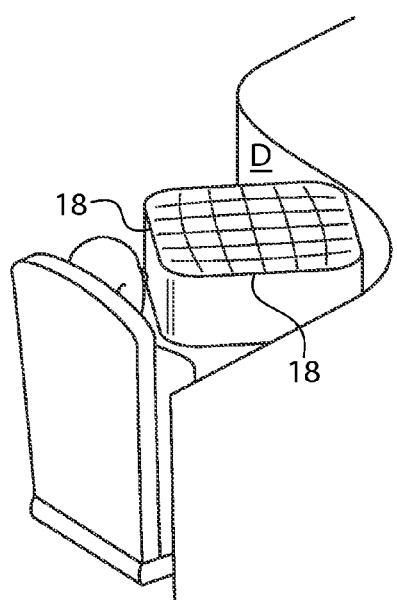
FIG. 3 shows a rear perspective view of the airbag of FIG. 1.
Figure 4:
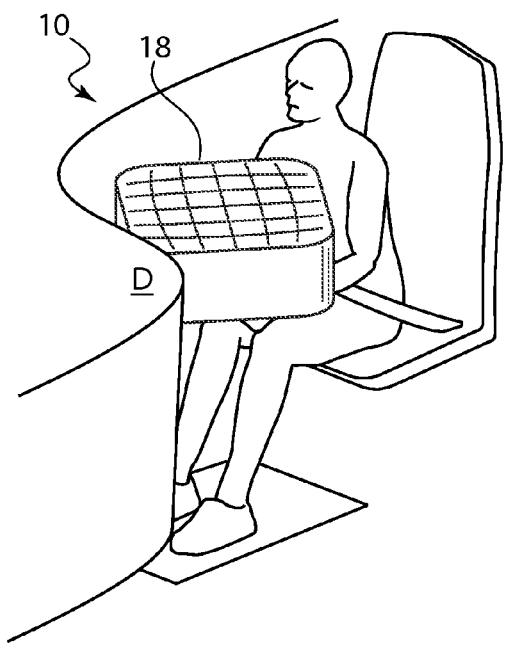
FIG. 4 shows a side perspective view of the airbag of FIG. 1.
Figure 5:
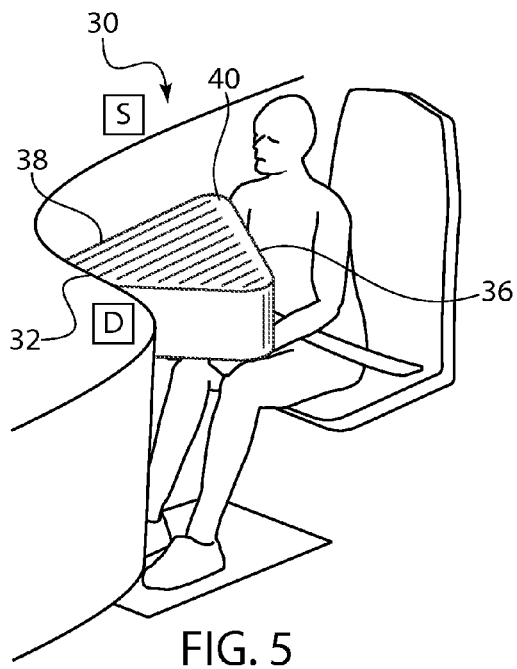
FIG. 5 shows a top perspective view of an alternate airbag according to another embodiment of this invention.
Figure 6:
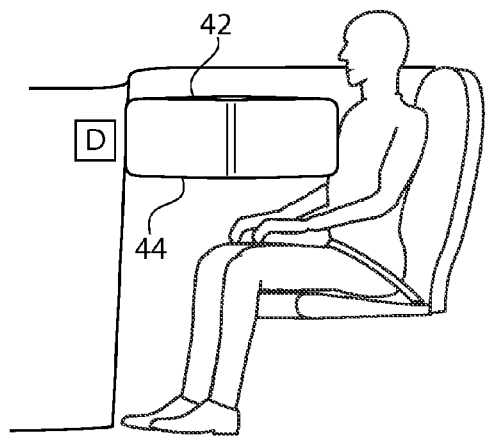
FIG. 6 shows a side plan view of the airbag of FIG. 5.

There may be some instances in which it is not desirable for a vehicle airbag to actually "catch" or capture or otherwise envelope the vehicle occupant within the airbag material. For example, the present inventors have sought to develop an airbag that, rather than "catching" the occupant, deviates the occupant's movement away from one or more hazardous structures (or structures that could be hazardous upon impact at a heightened speed, such as a tray table, a seat back, a steering wheel, a dashboard or any other interior vehicle structure.) This may be particularly beneficial in an aircraft, where space and weight are at a premium, and where there are a number of internal vehicle structures that are positioned in very close contact with the vehicle occupants. However, all of the embodiments described herein may be equally usable and beneficial in an automobile, such as a car, truck, bus or any other passenger transport vehicle.

The airbags described herein generally have a shape and a securement or deployment location that guides the vehicle occupant from the beginning of movement during a crash—in many instances, the airbags guide the occupant to the left or the right side from his/her original position. Embodiments of the present invention provide airbags that have non-traditional (and in some instances, asymmetrical) shapes. The airbags may be associated with a seat back, such that the airbags deploy backward to support a passenger in a seat behind. Alternatively, they may be associated with a steering wheel, a side wall of a vehicle, or an armrest, a seat back, or any other vehicle structure.

One embodiment of an airbag 10 with a non-traditional shape is shown in FIGS. 1-4. The airbag 10 shown in these figures has a square-like cross-sectional shape 12. One "corner" 14 of the square is an end that is secured to a deployment area "D." An opposite "corner" 16 is directed generally in the direction of the vehicle occupant. This may be referred to as an occupant-facing corner 16. Although referred to as "corners," the airbag edges are not necessarily right angle edges, and are obviously preferably not sharp pointed edges. Instead, the edges are generally rounded corners that join two sides 18 of the airbag 10. The term "corner" as used herein is intended to refer to a junction of two sides.

In the embodiment shown in FIGS. 1-4, the sides 18 are all of generally equal length, although it should be understood that a rectangular shape may be used, where two or more sides are longer than two other sides, or any other shape may be used. The general concept provided by airbag 10 is that the passenger is deflected to one of the sides 18.

In use, the square-like airbag 10 deploys from deployment area D and is designed to cause the vehicle occupant to move to either side 18 of the airbag 10. The airbag 10 is positioned along a plane that causes side movement of the occupant, rather than catching the occupant in a frontal manner. For example, corner 16 deflects the vehicle occupant and causes him/her to move forward (due to forward momentum in a crash condition) and alongside one of the airbag sides 18. The occupant may be caused to deflect against either the left or right hand side of the airbag 10. The side corners 20, 22 extend outwardly and help prevent the vehicle occupant from hitting an interior structure, such as an interior window, door, or privacy shell.

Airbag 10 may be formed from a top layer 24 of and a bottom 26 layer, with either a single layer of material forming all of the sides 18 or with an individual sheet of material forming each side 18. The material used for the layers 24, 26 and sides 18 may be any traditional airbag material, and the seams may be formed using any appropriate manufacturing method.

Figure 7:
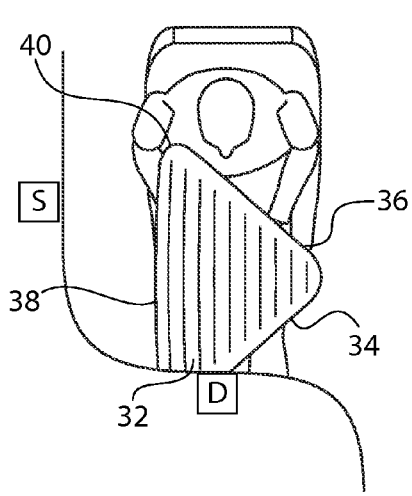
FIG. 7 shows a top plan view of the airbag of FIG. 5.
Figure 8:
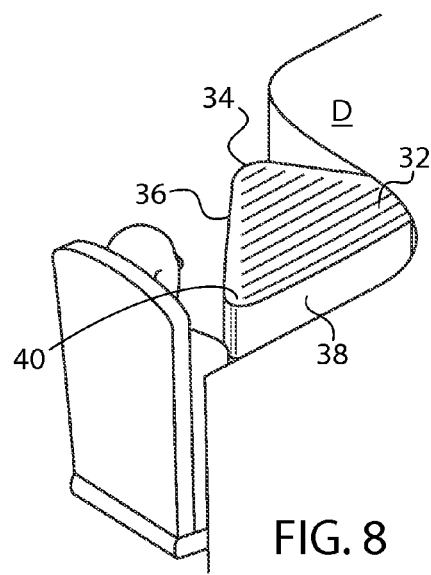
FIG. 8 shows a rear perspective view of the airbag of FIG. 5.
Figure 9:
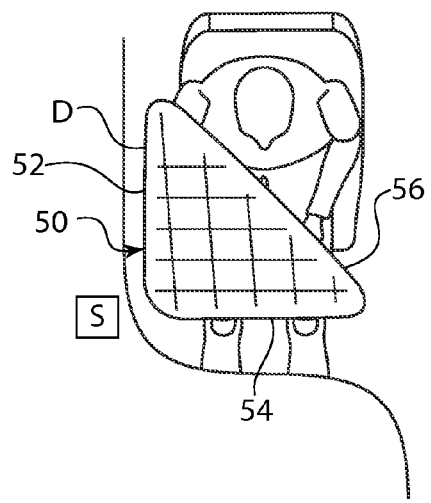
FIG. 9 shows a top plan view of an airbag according to a further embodiment of this invention.
Figure 10:
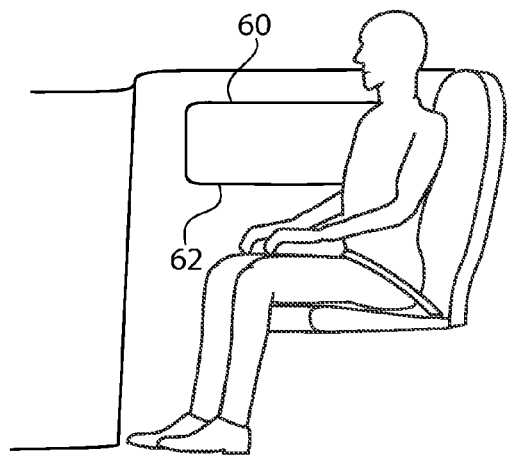
FIG. 10 shows a side plan view of the airbag of FIG. 9.
Figure 11:
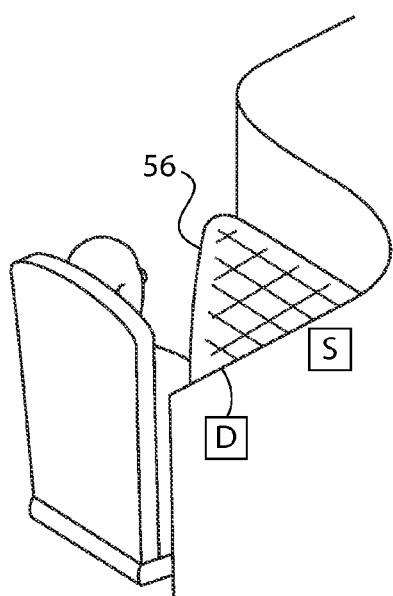
FIG. 11 shows a rear perspective view of the airbag of FIG. 9.
Figure 12:
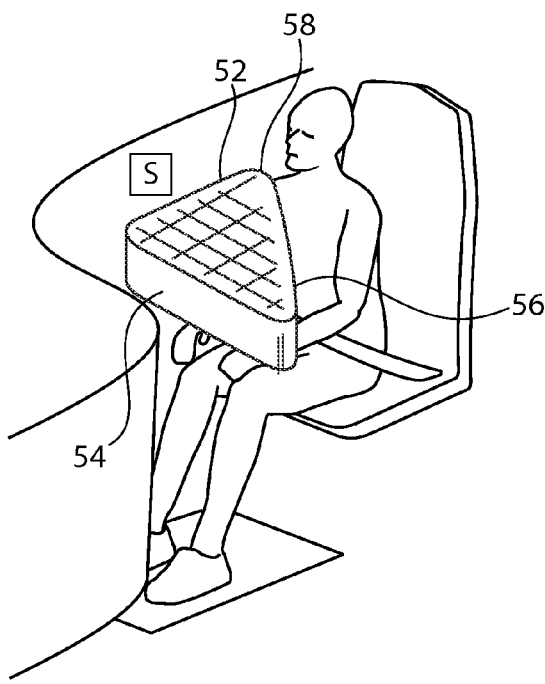
FIG. 12 shows a side perspective view of the airbag of FIG. 9.

FIGS. 5-8 show an alternate embodiment of a non-traditionally shaped airbag 30. One of the primary features of airbag 30 is that it features a deflection side, which is a generally straight side of the airbag that deflects the vehicle occupant away from an interior vehicle structure. More specifically, airbag 30 has an asymmetrical shape, which specifically directs the vehicle occupant in one direction. Its shape is an offset quadrilateral, somewhat resembling a trapezoidal cross section. In the embodiment shown, airbag 30 has a connection side 32, wherein the airbag 30 is secured to deployment area D. Extending a slight angle away from connection side 32 is support side 34. Extending a slight angle away from support side 34 is an elongated deflection side 36. Extending a slight angle away from elongated deflection side 36 is a structure-facing side 38. Deflection side 36 and structure-facing side 38 meet at a corner 40, which in use, is generally positioned near the vehicle occupant's shoulder. An example of this configuration is illustrated in FIGS. 7 and 8. From the top perspective view of FIGS. 7 and 8, airbag 30 closely resembles a triangular shape, albeit having an extra side 34.

In use, airbag 30 deploys from deployment area D and is designed to deflect the vehicle occupant to the elongated deflection side 36, away from structure S. The corner 40 (preferably not formed as a pointed edge, however) causes the occupant to move away from the interior structure S (such as an interior window, door, or privacy shell), which is bounded by the structure-facing side 38 of the airbag 30. The airbag 30 is positioned along a plane that causes a side and inward movement of the occupant, away from the structure, rather than catching the occupant in a frontal manner. Corner 40 deflects the vehicle occupant away from the structure and causes him/her to move forward (due to forward momentum in a crash condition) and alongside the deflection side 36.

Airbag 30 may be formed from a top layer 42 of and a bottom 44 layer, with either a single layer of material forming all of the sides or with an individual sheet of material forming each side 34, 36, 38. The material used for the layers and sides may be any traditional airbag material, and the seams may be formed using any appropriate manufacturing method.

FIGS. 9-12 illustrate another embodiment of a non-traditionally shaped airbag. One of the primary features of airbag 50 is that it features a deflection side, which is a generally straight side of the airbag that deflects the vehicle occupant away from an interior vehicle structure. In the embodiment shown, airbag 50 has a generally triangularly shaped cross section. Airbag 50 is deployed from a deployment area D that is on the side of the vehicle occupant. Deployment area D may either be a privacy shell, a side wall, an armrest, a side of the seat, or any other side-positioned location. Airbag 50 has a connection side 52, wherein the airbag 50 is secured to deployment area D. Extending away from connection side 52 is support side 54. Extending away from support side 54 second is an elongated deflection side 56. Deflection side 36 and connection side 52 meet at a corner 58, which in use, is generally positioned near the vehicle occupant's shoulder. The corner 58 may be the primary connection point for the airbag 50 to deployment area D, or the connection may be along one or more points of the connection side 52. In one embodiment, the airbag 50 may be stored inside the seat armrest, and be deployed therefrom. In another embodiment, the airbag 50 may be stored inside or along the seat back, and be deployed therefrom. In a further embodiment, the airbag 50 may be fixed to the armrest, as well as fixed to a portion of the seat back, such that it has two points of connection, which can lend stability to the airbag upon deployment. From the top perspective view of FIG. 9, airbag 50 closely resembles a triangular shape, with the long deflection side 56 extending in front the vehicle occupant.

In use, airbag 50 deploys from deployment area D and is designed to deflect the vehicle occupant away from structure S, along the elongated deflection side 56. The attachment of the airbag 50 to the deployment area creates a barrier between the vehicle occupant and the structure S, such that the occupant is deflected away from the structure, along deflection side 56. The airbag 50 is positioned along a plane that causes a side and inward movement of the occupant, away from the structure, rather than catching the occupant in a frontal manner.

Airbag 50 may be formed from a top layer 60 of and a bottom 62 layer, with either a single layer of material forming all of the sides or with an individual sheet of material forming each side 52, 54, 56. The material used for the layers and sides may be any traditional airbag material, and the seams may be formed using any appropriate manufacturing method.

For all of the airbags described herein, at least one portion of each airbag has an opening for receiving inflation gas. In use and during a crash condition, inflation gas is immediately and rapidly pumped into the opening in order to cause the airbag to inflate and cushion a vehicle occupant's forward momentum. The opening of each airbag may have a tube fluidly connected to and extending therefrom. The tube is also fluidly connected to a gas inflator system. In use, the airbag system is packed into a compartment or opening in a seat back or other deployment area D, such as a steering wheel, or any other component in the vehicle from which an airbag may deploy.

Each seat includes a system that is designed to deploy the airbag when needed, at the appropriate time. In one particular embodiment, a gas inflator and a crash sensor are mounted on or otherwise associated with the seat. The gas inflator contains gas under high pressure that is restrained with a valve. The crash sensor is equipped with an accelerometer sensor that is designed to detect a crash condition. The gas inflator and the airbags are fluidly linked via a gas delivery tube. The gas inflator and the crash sensor may be are linked via electric wiring or they may communicate wirelessly therebetween or with other aircraft components. In normal use, the airbags 10, 30, 50 maintain their stored position in deployment area D. When a crash condition occurs, the crash sensor detects an abnormal acceleration and sends a signal to the gas inflator to open the valve and cause gas to flow into the airbag, causing the airbag to deploy.

Changes and modifications, additions and deletions may be made to the structures and methods recited above and shown in the drawings without departing from the scope or spirit of the invention and the following claims.

What is claimed is:

1. An airbag system, comprising: an airbag comprising
   (a) a first area configured to be positioned in front of a vehicle occupant,
   (b) a deployment area in front of the vehicle occupant,
   (c) left and right deflection sides extending from the first area, wherein in use, the vehicle occupant is deflected sideways, toward one of the left or right deflection sides of the airbag, away from the first area.

2. The airbag system of claim 1, wherein the airbag comprises a generally square-shaped cross-section.

3. The airbag system of claim 1, wherein the airbag is configured to be secured to an interior structure of a vehicle at the deployment area.

4. The airbag system of claim 1, further comprising a gas inflator in fluid communication with the airbag, and a crash sensor configured to activate inflation of the airbag.

5. An airbag system, comprising: an airbag, comprising
   (a) a deployment area where the airbag is configured to be secured to an interior structure of a vehicle;
   (b) an elongated deflection side comprising a straight side of the airbag that has a first area near a passenger's shoulder and an angled portion that creates an inward angle of deflection such that the elongated deflection side causes inward and side movement of the vehicle occupant in use to deflect a vehicle occupant away from an interior vehicle structure.

6. The airbag system of claim 5, wherein the airbag comprises a generally quadrilateral-shaped cross-section.

7. The airbag system of claim 5, wherein the airbag comprises a generally triangular-shaped cross-section.

8. The airbag system of claim 5, wherein the deployment area is in front of the vehicle occupant.

9. The airbag system of claim 5, wherein the deployment area is to the side of the vehicle occupant.

10. The airbag system of claim 5, wherein the airbag further comprises:
    (a) a connection side, configured to secure the airbag to the deployment area; and
    (b) a support side extending away from the connection side.

11. The airbag system of claim 10, further comprising (c) a structure-facing side extending away from the elongated deflection side.

12. The airbag system of claim 5, wherein the airbag is configured to be deployed from an armrest of a seat.

13. The airbag system of claim 5, wherein the airbag is configured to be deployed from a seat back.

14. The airbag system of claim 5, further comprising a gas inflator in fluid communication with the airbag, and a crash sensor configured to activate inflation of the airbag.

* * * * *